(12) United States Patent
Lugo

(10) Patent No.: US 12,360,318 B2
(45) Date of Patent: Jul. 15, 2025

(54) COMBINER HOUSING FOR OPTICAL FIBER COMBINER

(71) Applicant: nLIGHT, INC., Camas, WA (US)

(72) Inventor: Juan Carlos Lugo, Camas, WA (US)

(73) Assignee: nLIGHT, Inc., Camas, WA (US)

( * ) Notice: Subject to any disclaimer, the term of this patent is extended or adjusted under 35 U.S.C. 154(b) by 200 days.

(21) Appl. No.: 18/016,067

(22) PCT Filed: Jul. 14, 2021

(86) PCT No.: PCT/US2021/041683
§ 371 (c)(1),
(2) Date: Jan. 13, 2023

(87) PCT Pub. No.: WO2022/015886
PCT Pub. Date: Jan. 20, 2022

(65) Prior Publication Data
US 2023/0258869 A1    Aug. 17, 2023

Related U.S. Application Data

(60) Provisional application No. 63/051,824, filed on Jul. 14, 2020.

(51) Int. Cl.
*G02B 6/255* (2006.01)
*G02B 6/04* (2006.01)
(Continued)

(52) U.S. Cl.
CPC ............. *G02B 6/2558* (2013.01); *G02B 6/04* (2013.01); *G02B 6/2808* (2013.01);
(Continued)

(58) Field of Classification Search
CPC ................................. G02B 6/04; G02B 6/2558
See application file for complete search history.

(56) References Cited

U.S. PATENT DOCUMENTS

| 10,218,142 B1* | 2/2019 | Hsia ........................ H01S 3/0407 |
| 2009/0154881 A1* | 6/2009 | Salokatve ............ G02B 6/2835 264/1.25 |

(Continued)

FOREIGN PATENT DOCUMENTS

| CN | 204347293 U | 5/2015 |
| CN | 107861193 A | 3/2018 |

(Continued)

OTHER PUBLICATIONS

International Search Report and Written Opinion dated Oct. 21, 2021, for International Patent Application No. PCT/US2021/041683.

*Primary Examiner* — Michael Stahl
(74) *Attorney, Agent, or Firm* — Wiley Rein LLP

(57) ABSTRACT

A capillary combiner housing for an optical fiber combiner has an inner combiner casing supporting optical fibers. The capillary combiner housing includes a non-metallic body defining a lumen between an input side and an output side, the lumen sized to receive the inner combiner casing, the non-metallic body having a coefficient of thermal expansion substantially matching that of the inner combiner casing. Also included is a first aperture in the input side, the first aperture having a first inside diameter sized to receive multiple input optical fibers, and a second aperture in the output side, the second aperture having a second inside diameter sized to receive an output fiber.

18 Claims, 5 Drawing Sheets

(51) Int. Cl.
 *G02B 6/28* (2006.01)
 *H01S 3/067* (2006.01)
(52) U.S. Cl.
 CPC ........ *G02B 6/2856* (2013.01); *H01S 3/06704* (2013.01); *H01S 3/06745* (2013.01)

(56) References Cited

U.S. PATENT DOCUMENTS

| | | | |
|---|---|---|---|
| 2011/0221081 A1* | 9/2011 | Wang | G02B 6/2558 264/1.25 |
| 2014/0241663 A1 | 8/2014 | Fomin et al. | |
| 2015/0139587 A1* | 5/2015 | Kozak | G02B 6/04 65/409 |

FOREIGN PATENT DOCUMENTS

| | | | |
|---|---|---|---|
| GB | 2542663 A | 3/2017 | |
| KR | 20150123824 A | 11/2015 | |

\* cited by examiner

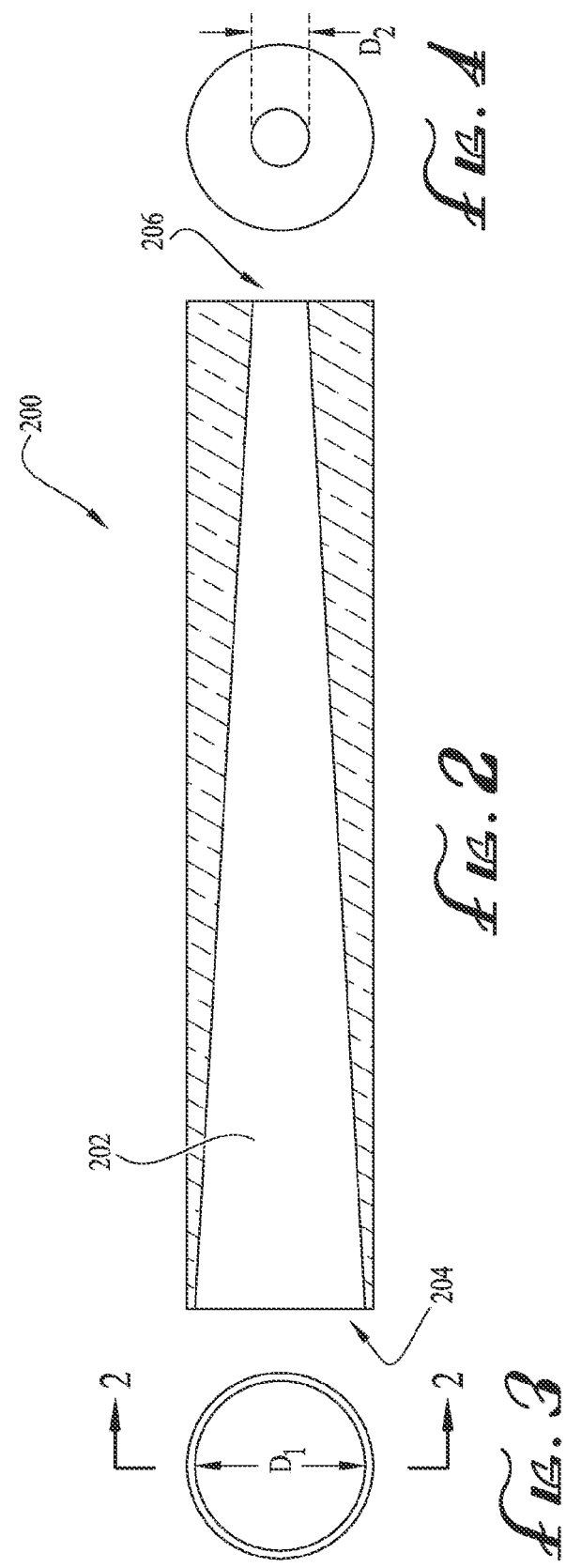

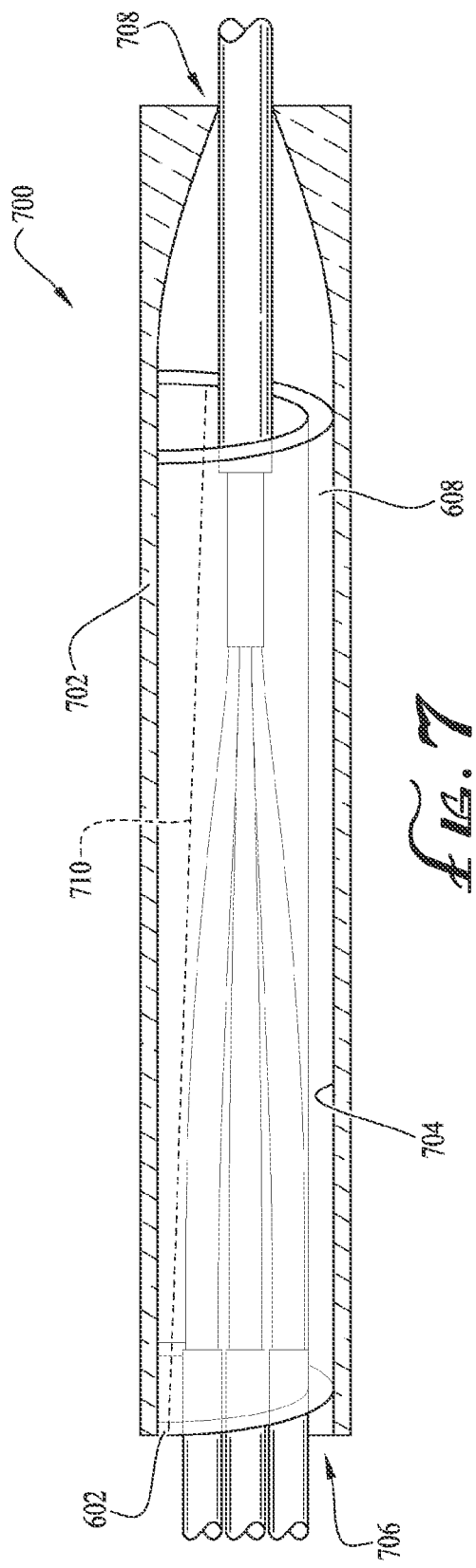
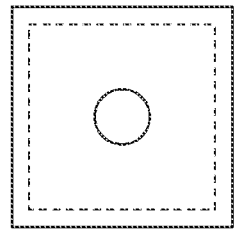
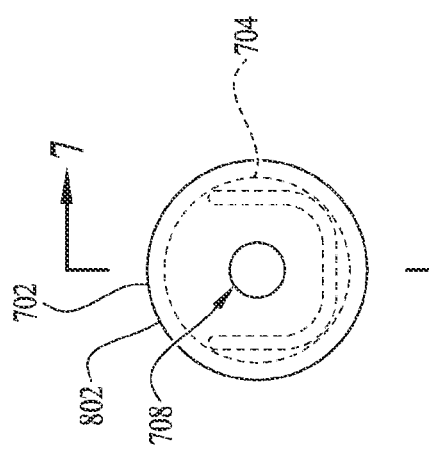

COMBINER HOUSING FOR OPTICAL FIBER COMBINER

RELATED APPLICATION

This United States Non-Provisional Patent Application is a National Stage Entry that relies on and claims priority from International Patent Application No. PCT/US2021/041683, filed on Jul. 14, 2021, and also relies on and claims priority to U.S. Provisional Patent Application No. 63,051,824, filed on Jul. 14, 2020, the contents of both of which are incorporated by reference herein in their entireties.

TECHNICAL FIELD

The disclosure relates to methods and devices for combining optical signals.

BACKGROUND INFORMATION

Most of the problems with a combiner housing have to do with coefficient of thermal expansion (CTE) mismatch, withstanding of a lot of heat, good thermal conductivity, and thermal shock resistance. Making a combiner housing can be very expensive and usually depends on a lot of engineering work to calculate the CTE of the housing so that it does not exceed that of the combiner.

Most combiner housings are made with metal such as gold-plated copper tungsten. These metals are expensive, hard to machine, and while the thermal conductivity is good, the CTE is still a limitation to combiners. To use such metal housings for combiners, they are precisely machined to avoid air gaps between the metal housing and cooling plate, since the air gaps cause thermal expansion or contraction that stresses the optical fibers. Thus, the metal combiners are made to withstand higher proof testing and can result in a lower yield of the combiner's output. Also, most of these packages are easily exposed to contamination since the package is not completely sealed, and dust particles, Loctite, or other liquids can get inside the package causing the combiner to fail.

SUMMARY OF THE DISCLOSURE

By arranging a fused silica capillary signal combiner housing package that is sufficiently airtight and that fully encapsulates the combiner, the deficiencies of conventional methods discussed above may be overcome.

In one aspect, a capillary combiner housing for an optical fiber combiner having an inner combiner casing supporting optical fibers, includes a non-metallic body defining a lumen between an input side and an output side, the lumen sized to receive the inner combiner casing, the non-metallic body having a coefficient of thermal expansion substantially matching that of the inner combiner casing, a first aperture in the input side, the first aperture having a first inside diameter sized to receive multiple input optical fibers, and a second aperture in the output side, the second aperture having a second inside diameter sized to receive an output fiber.

In another aspect, a signal combiner package includes the capillary combiner housing and may also include and the optical fiber combiner having the inner combiner casing.

In an example, the disclosed housing may be a very inexpensive fused silica capillary package. Making a housing out of a fused silica tube may be selected to have one or more advantages listed below: can withstand high temperature with near zero thermal expansion; exceptionally good thermal shock resistance; very good chemical inertness; can be lapped and polished to fine finishes; high transparency from the ultraviolet to the infrared spectral range; airtight enclosed housing eliminating the possibility of contamination; and will need not employ a water-cooled metal housing. Other technical features may be readily apparent to one skilled in the art from the following figures, descriptions, and claims.

The foregoing and other objects, features, and advantages will become more apparent from the following detailed description, which proceeds with reference to the accompanying figures which may not be drawn to scale.

BRIEF DESCRIPTION OF THE DRAWINGS

To easily identify the discussion of any particular element or act, the most significant digit or digits in a reference number refer to the figure number in which that element is first introduced.

FIG. 2 is a cross-sectional side elevation view of a fused silica capillary combiner housing configured to house the tapered optical fiber capillary of FIG. 1.

FIG. 3 is an input end view of the fused silica capillary combiner housing of FIG. 2.

FIG. 4 is an output end view of the fused silica capillary combiner housing of FIG. 2.

FIG. 7 is a cross-sectional side elevation view of the non-capillary optical fiber combiner of FIG. 6 shown in an assembled state.

FIG. 8 is an output end view of the assembly shown in FIG. 7.

FIG. 9 is an output end view according to another embodiment.

DETAILED DESCRIPTION OF EMBODIMENTS

Figure 1:
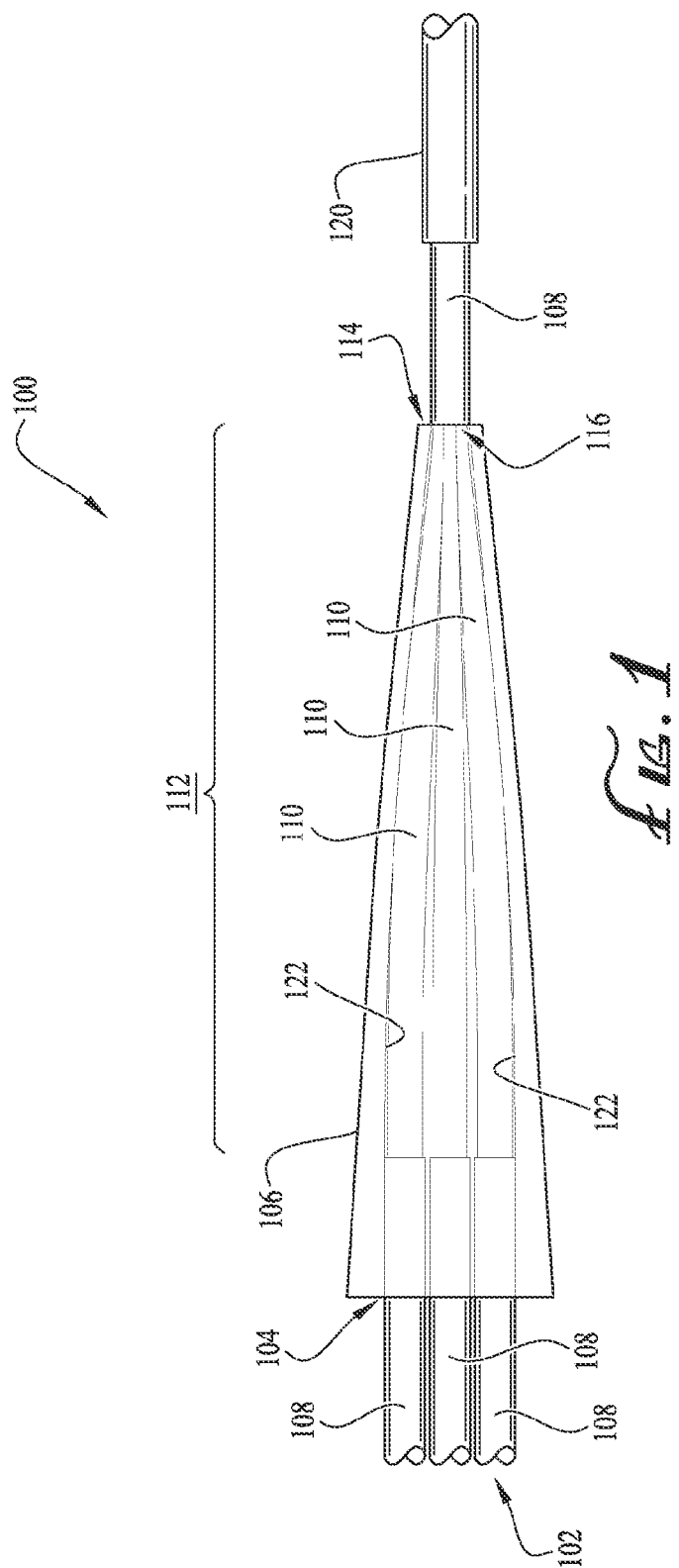
FIG. 1 is a side elevation view of a capillary optical fiber combiner including a tapered optical fiber capillary of fused silica.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like. These terms are used for convenient description, but do not imply any particular spatial orientation. Moreover, in the following examples, laser components and assemblies are described at a high level of abstraction and do not include a complete description of all mechanical, electrical and optical elements necessary for operation.

As used herein, optical radiation refers to electromagnetic radiation at wavelengths of between about 100 nm and 10 µm, and typically between about 500 nm and 2 µm. Examples based on available laser diode sources and optical fibers generally are associated with wavelengths of between about 800 nm and 1700 nm. In some examples, propagating optical radiation is referred to as one or more beams having diameters, asymmetric fast and slow axes, beam cross-sectional areas, and beam divergences that can depend on beam wavelength and the optical systems used for beam shaping. For convenience, optical radiation is referred to as light or beams in some examples and need not be at visible wavelengths. Forward-propagating light or optical beams or beam portions refer to light, beams, or beam portions that propagate in a common direction with a processing beam that is directed to a target. Backward-propagating light or optical beams or beam portions refer to light, beams, or beam portions that propagate in a common and opposite direction of a processing beam that is directed to a target.

Representative embodiments are described with reference to optical fibers, but other types of optical waveguides can be used having square, rectangular, polygonal, oval, elliptical or other cross-sections. Optical fibers are typically formed of silica (glass) that is doped (or undoped) so as to provide predetermined refractive indices or refractive index differences. In some, examples, fibers or other waveguides are made of other materials such as fluorozirconates, fluoroaluminates, fluoride or phosphate glasses, chalcogenide glasses, or crystalline materials such as sapphire, depending on wavelengths of interest. Refractive indices of silica and fluoride glasses are typically about 1.5, but refractive indices of other materials such as chalcogenides can be 3 or more. In still other examples, optical fibers can be formed in part of plastics. In typical examples, a doped waveguide core such as a fiber core provides optical gain in response to pumping, and core and claddings are approximately concentric. In other examples, one or more of the core and claddings are decentered, and in some examples, core and cladding orientation and/or displacement vary along a waveguide length.

In the examples disclosed herein, a waveguide core such as an optical fiber core is doped with a rare earth element such as Nd, Yb, Ho, Er, or other active dopants or combinations thereof. Such actively doped cores can provide optical gain in response to optical or other pumping. As disclosed below, waveguides having such active dopants can be used to form optical amplifiers, or, if provided with suitable optical feedback such as reflective layers, mirrors, Bragg gratings, or other feedback mechanisms, such waveguides can generate laser emissions. Optical pump radiation can be arranged to co-propagate and/or counter-propagate in the waveguide with respect to a propagation direction of an emitted laser beam or an amplified beam.

FIG. 1 shows a capillary optical fiber combiner 100. Multiple input fibers 102 (e.g., nine) enter an input end 104 of a tapered optical fiber capillary 106. Each of input fibers 102 includes a buffer coating 108 encompassing a tapered input optical fiber 110, e.g., a silica fiber, which may include a cladding and core (not shown). Other layers of fiber optics (e.g., outer jacket) are optional and not shown.

Tapered input optical fibers 110 are bundled and tapered within a tapered optical fiber capillary 106, which is also referred to as a capillary optical combiner or a capillary signal combiner. In some embodiments, tapered optical fiber capillary 106 is glass, ceramic, or fused silica formed in a tapered shape with inside and outside diameters. In some embodiments, the inside and outside diameters gradually decrease in size such that a sidewall throughout a tapered region 112 is generally uniform in thickness. Thus, the inside diameter throughout tapered region 112 is sized so that it is complementary to the shape of the gradual taper of tapered input optical fibers 110.

Input end 104 and output end 114 are sealed using index-matching epoxy or a heat source to collapse tapered optical fiber capillary 106. At a combiner splice 116 toward an output end 114 of tapered optical fiber capillary 106, tapered input optical fibers 110 are spliced to an output optical fiber 118 of an output fiber 120. Thus, optical signals from any of input fibers 102 are provided to output fiber 120.

In some embodiments, an inside conical surface 122 of tapered optical fiber capillary 106 abuts tapered input optical fiber 110. Accordingly, inside conical surface 122 may have the same refractive index as that of tapered input optical fibers 110.

FIG. 2 shows a capillary combiner housing 200 of fused silica that is configured to house tapered optical fiber capillary 106 (FIG. 1). For example, capillary combiner housing 200 is a capillary tube, or other tubular body, defining a conical lumen 202 between apertures at an input end 204 and an output end 206. In some embodiments, conical lumen 202 is machined, etched, or otherwise fabricated in the fused silica so that its tapered shape is complementary to that of tapered optical fiber capillary 106. Specifically, FIG. 3 shows input end 204 having a first inner diameter $D_1$; and FIG. 4 shows output end 206 having a second inner diameter, $D_2$, which is less than $D_1$. The outer cylindrical diameters are the same. Skilled persons will also appreciate that the outer periphery need not be cylindrical and can be other shapes, e.g., square.

As noted above, the body of capillary combiner housing 200 is fused silica. For comparison, INVAR (a nickel-iron alloy), which has the lowest thermal expansion among all metals and alloys near room temperature, has a mean CTE that is more than twice that of fused silica (1.3×10-6°/K over the 20° C. to 100° C. temperature range). Depending on the application, capillary combiner housing 200 may be glass, fused quartz, ceramic, or other non-metallic materials. Various materials having a CTE substantially matching that of tapered optical fiber capillary 106 are also possible.

Figure 5:
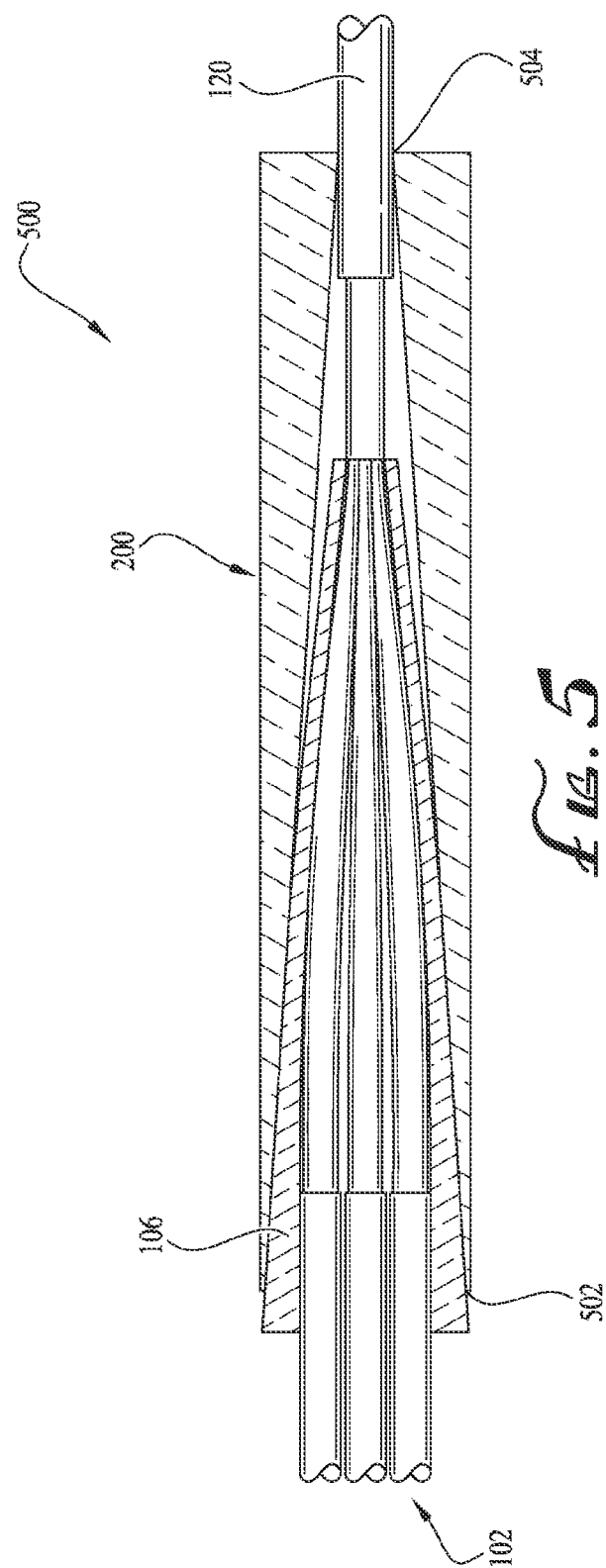
FIG. 5 is a cross-sectional side elevation view of an optical fiber combiner assembly including the tapered optical fiber capillary of FIG. 1 housed within the capillary combiner housing of FIG. 2.

FIG. 5 shows an optical fiber combiner assembly 500 (also called a housed combiner or combiner package), which includes capillary optical fiber combiner 100 within capillary combiner housing 200.

An input seal 502 and an output seal 504 are formed using index-matching epoxy (e.g., low or high) or by using a heat source to collapse the fused silica components and form an airtight seal.

Because capillary optical fiber combiner 100 and capillary combiner housing 200 have low matching CTEs of fused silica, these components are thermally stable such that there is no thermal expansion or contraction introducing mechanical stresses to the fibers in the system. Furthermore, metals could reflect or absorb some light emitted from optical fibers whereas optical fiber combiner assembly 500 is generally transmissive.

Figure 6:
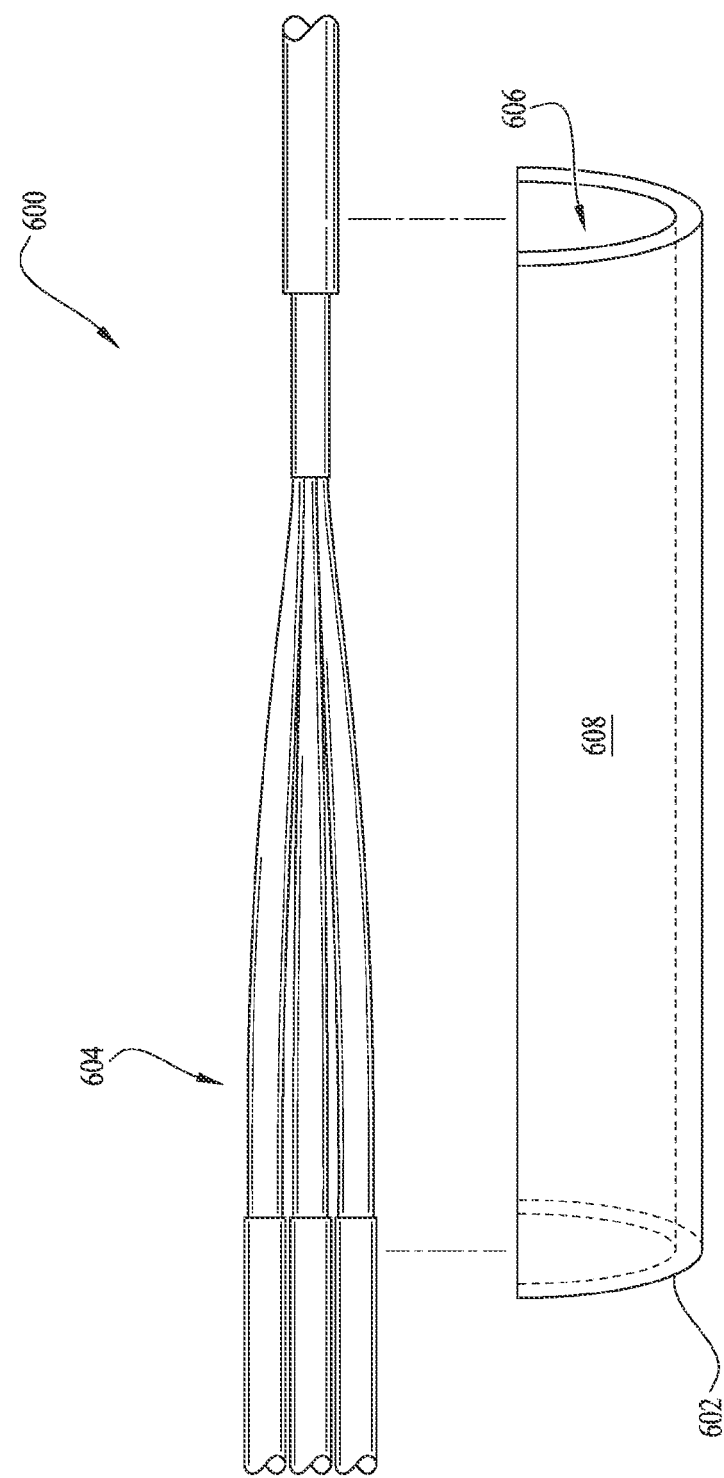
FIG. 6 is a partly exploded, side elevation view of a non-capillary optical fiber combiner including a capillary-less optical fiber combiner configured to rest in a fused silica cradle.

FIG. 6 shows a non-capillary optical fiber combiner 600 including a fused silica cradle 602 to carry a capillary-less optical fiber combiner 604 (also referred to a twist bundle combiner). As described previously, other non-metal, low CTE materials such as glass, fused quartz, or ceramics may be employed for cradle 602.

Capillary-less optical fiber combiner 604 lacks tapered optical fiber capillary 106 (FIG. 1) and instead rests in cradle 602, which includes a U-shaped interior channel 606 sized to receive the multiple fibers that are spliced to an output fiber. Cradle 602 helps support and protect capillary-less optical fiber combiner 604 because it is typically fragile and challenging to transport. Thus, cradle 602 and tapered optical fiber capillary 106 are each referred to herein as an inner combiner casing having a CTE that substantially matches that of the combiner housing.

As described later with reference to FIG. 7, a U-shaped exterior surface 608 is shaped so that it slides into a housing having a complementary shape. Skilled persons will appreciate that, in some other embodiments, an exterior surface may have other slidable shapes (e.g., square).

FIG. 7 shows optical fiber combiner assembly 700, which includes capillary-less optical fiber combiner 604 within cradle 602 and a fused silica capillary combiner housing 702 slide over cradle 602. U-shaped exterior surface 608 slides over and confronts an interior surface 704 of capillary combiner housing 702. In the present example, interior surface 704 is machined, etched, or otherwise fabricated so that it is U-shaped, but various other shapes are possible. Skilled persons will also appreciate that U-shaped exterior surface 608 and interior surface 704 need not have entirely complementary shapes and gaps are possible between these surfaces.

Input end 706 and output ends 708 are sealed using index-matching epoxy. A heat source may be used to help collapse both ends (e.g., collapse low temperature melting glass).

FIG. 7 also shows a taper line 710. In some embodiments, cradle 602 may be tapered along taper line 710, and capillary combiner housing 702 is fabricated to follow taper line 710 so that its upper surface abuts that of cradle 602. Other taper shapes are also possible along different sides of cradle 602 and capillary combiner housing 702.

FIG. 8 shows an end view of output end 708 of capillary combiner housing 702. In this embodiment, interior surface 704 is U-shaped show that it matches the shape of U-shaped exterior surface 608. FIG. 8 also shows an exterior surface 802 is cylindrical.

FIG. 9 shows an end view of a capillary combiner housing, according to another embodiment. In this embodiment, its interior and exterior surfaces are square. Other end view periphery shapes are also possible.

Having described and illustrated the general principles of examples of the presently disclosed technology, it should be apparent that the examples may be modified in arrangement and detail without departing from such principles. Skilled persons, therefore, will appreciate that many changes may be made to the details of the above-described embodiments without departing from the underlying principles of the invention. For example, glass, ceramics, fused quartz, or other materials having a CTE substantially matching that of optical fibers (e.g., fused silica) may be used for combiner housings. The scope of the present invention should, therefore, be determined only by the following claims.

The invention claimed is:

1. A capillary combiner housing for an optical fiber combiner having an inner combiner casing supporting optical fibers, comprising:
   a non-metallic body defining a lumen between an input side and an output side, the lumen sized to receive the inner combiner casing, the non-metallic body having a coefficient of thermal expansion substantially matching that of the inner combiner casing,
   a first aperture in the input side, the first aperture having a first inside diameter sized to receive multiple input optical fibers, and
   a second aperture in the output side, the second aperture having a second inside diameter sized to receive an output fiber,
   wherein the lumen is tapered from the first inside diameter to the second inside diameter.

2. The capillary combiner housing of claim 1, in which the non-metallic body comprises fused silica.

3. The capillary combiner housing of claim 1, in which the non-metallic body comprises glass.

4. The capillary combiner housing of claim 1, in which the non-metallic body comprises fused quartz.

5. The capillary combiner housing of claim 1, in which the non-metallic body comprises ceramic material.

6. The capillary combiner housing of claim 1, in which material of the inner combiner casing matches that of the non-metallic body.

7. The capillary combiner housing of claim 1, in which the non-metallic body has a cylindrical exterior shape.

8. The capillary combiner housing of claim 1, in which the first inside diameter is sized to receive the multiple input fibers secured in a tapered optical fiber capillary as the inner combiner casing.

9. The capillary combiner housing of claim 1, in which the first inside diameter is sized to receive the multiple input fibers secured in a cradle as the inner combiner casing.

10. The capillary combiner housing of claim 1, in which the second inside diameter is sized to receive an output fiber spliced to multiple input fibers.

11. A signal combiner package including the capillary combiner housing of claim 1 and the optical fiber combiner having the inner combiner casing.

12. The signal combiner package of claim 11, in which the inner combiner casing is tapered.

13. The signal combiner package of claim 11, in which the inner combiner casing is a U-shaped cradle.

14. The signal combiner package of claim 11, in which the inner combiner casing comprises fused silica.

15. The signal combiner package of claim 11, in which the inner combiner casing comprises glass.

16. The signal combiner package of claim 11, in which the inner combiner casing comprises fused quartz.

17. The signal combiner package of claim 11, in which the inner combiner casing comprises ceramic material.

18. The signal combiner package of claim 11, in which material of the inner combiner casing matches that of the non-metallic body.

\* \* \* \* \*